(12) United States Patent
Frasnetti et al.

(10) Patent No.: US 11,505,349 B2
(45) Date of Patent: Nov. 22, 2022

(54) WRAPPING MACHINE

(71) Applicant: Fabio Perini S.p.A., Lucca (IT)

(72) Inventors: Luca Frasnetti, Montecarlo (IT); Fabio Pattuzzi, Bologna (IT); Daniele Bolognesi, Ozzano dell'Emilia (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 16/613,523

(22) PCT Filed: May 11, 2018

(86) PCT No.: PCT/EP2018/062232
§ 371 (c)(1),
(2) Date: Nov. 14, 2019

(87) PCT Pub. No.: WO2018/210697
PCT Pub. Date: Nov. 22, 2018

(65) Prior Publication Data
US 2020/0071007 A1    Mar. 5, 2020

(30) Foreign Application Priority Data
May 16, 2017    (IT) .................... 102017000052913

(51) Int. Cl.
*B65B 25/14*    (2006.01)
*B65B 59/00*    (2006.01)
(Continued)

(52) U.S. Cl.
CPC ............ *B65B 25/146* (2013.01); *B65B 11/22* (2013.01); *B65B 35/44* (2013.01); *B65B 59/001* (2019.05);
(Continued)

(58) Field of Classification Search
CPC ......... B65B 59/04; B65B 65/02; B65B 49/02; B65B 49/04; B65B 11/18; B65B 11/20; B65G 19/245; B65G 47/841; B65G 23/14
(Continued)

(56) References Cited

U.S. PATENT DOCUMENTS 2,642,176 A * 6/1953 De Burgh .............. B65G 23/14
                                                   198/721
6,067,780 A * 5/2000 Gentili .................. B65B 25/146
                                                    53/376.2
(Continued)

FOREIGN PATENT DOCUMENTS

EP    1067048 A1    1/2001
EP    1312549 A1    5/2003
(Continued)

*Primary Examiner* — Chelsea E Stinson
*Assistant Examiner* — Luis G Del Valle
(74) *Attorney, Agent, or Firm* — Breiner & Breiner, L.L.C.

(57) ABSTRACT

The wrapping machine includes a feed path of products to be wrapped in a wrapping sheet and, along the feed path, an insertion station of products to be wrapped in a wrapping sheet and folding members of the wrapping sheet. The machine further includes a conveyor device, which receives the products in the insertion station and causes their feed through the folding members. The conveyor device includes a system of endless flexible members formed by toothed belts guided around toothed wheels. Each toothed belt includes a first series of internal teeth, cooperating with toothed guide wheels, and a second series of external teeth, cooperating with connection elements of carriages that carry prongs for feeding the products to be wrapped. The connection elements include toothed profiles complementary to the external teeth of the toothed belts, suitable to provide a shape coupling with the external teeth of the respective toothed belts.

5 Claims, 11 Drawing Sheets

(51) Int. Cl.
  *B65B 11/22* (2006.01)
  *B65B 35/44* (2006.01)
  *B65B 59/04* (2006.01)
  *B65B 65/02* (2006.01)
  *B65G 19/24* (2006.01)
  *B65G 47/84* (2006.01)
(52) U.S. Cl.
  CPC ............ *B65B 59/005* (2013.01); *B65B 59/04* (2013.01); *B65B 65/02* (2013.01); *B65G 19/245* (2013.01); *B65G 47/841* (2013.01)
(58) Field of Classification Search
  USPC .............. 53/466, 203, 209, 228, 230, 231; 198/833, 867.1
  See application file for complete search history.

(56) References Cited

U.S. PATENT DOCUMENTS

| | | | | |
|---|---|---|---|---|
| 6,112,915 | A * | 9/2000 | Lewis | B65G 17/08 211/151 |
| 6,241,076 | B1 * | 6/2001 | Maguire | B65G 23/14 198/626.4 |
| 6,308,497 | B1 | 10/2001 | Cassoli et al. | |
| 6,431,378 | B1 * | 8/2002 | Lewis | B65G 17/08 211/151 |
| 6,688,077 | B1 * | 2/2004 | Focke | B65B 35/40 53/376.2 |
| 6,799,410 | B2 | 10/2004 | Gamberini | |
| 6,866,140 | B2 * | 3/2005 | Iwasa | B65B 5/106 198/803.13 |
| 7,219,784 | B2 * | 5/2007 | Fargo | B66B 23/028 198/833 |
| 7,654,386 | B2 * | 2/2010 | Dall'omo | B65B 25/146 53/228 |
| 7,789,219 | B2 | 9/2010 | Baldanza et al. | |
| 2002/0020608 | A1 * | 2/2002 | Maguire | B65G 23/14 198/626.4 |
| 2002/0059784 | A1 * | 5/2002 | Gamberini | B65B 59/001 53/531 |
| 2003/0136086 | A1 * | 7/2003 | Kalany | B65B 65/02 53/251 |
| 2004/0016213 | A1 * | 1/2004 | Loperfido | B65B 25/146 53/461 |
| 2005/0229538 | A1 * | 10/2005 | Dall' Omo | B65B 11/22 53/134.1 |
| 2005/0229546 | A1 * | 10/2005 | Poli | B65B 51/14 53/228 |
| 2006/0080945 | A1 * | 4/2006 | Baldanza | B65B 25/146 53/531 |
| 2007/0137143 | A1 * | 6/2007 | Dall'Omo | B65B 59/005 53/430 |
| 2007/0137144 | A1 * | 6/2007 | Dall'Omo | B65G 47/088 53/430 |
| 2008/0202074 | A1 * | 8/2008 | Frabetti | B65B 25/005 53/461 |
| 2008/0229709 | A1 * | 9/2008 | Dall'Omo | B65B 11/22 53/211 |
| 2013/0056332 | A1 * | 3/2013 | Cavina | B65G 19/02 198/728 |
| 2013/0068590 | A1 * | 3/2013 | Fujita | B65G 47/841 198/426 |
| 2014/0260087 | A1 * | 9/2014 | Antoniazzi | B65B 11/20 53/204 |
| 2016/0362257 | A1 * | 12/2016 | Papsdorf | B65G 47/53 |
| 2017/0029220 | A1 * | 2/2017 | Beaumont | A01K 1/015 |
| 2018/0007871 | A1 * | 1/2018 | Elferink | B65G 23/06 |

FOREIGN PATENT DOCUMENTS

| | | | | |
|---|---|---|---|---|
| WO | | 2011009485 A1 | 1/2011 | |
| WO | WO-2015193907 A1 * | | 12/2015 | ............ B65G 21/22 |

* cited by examiner

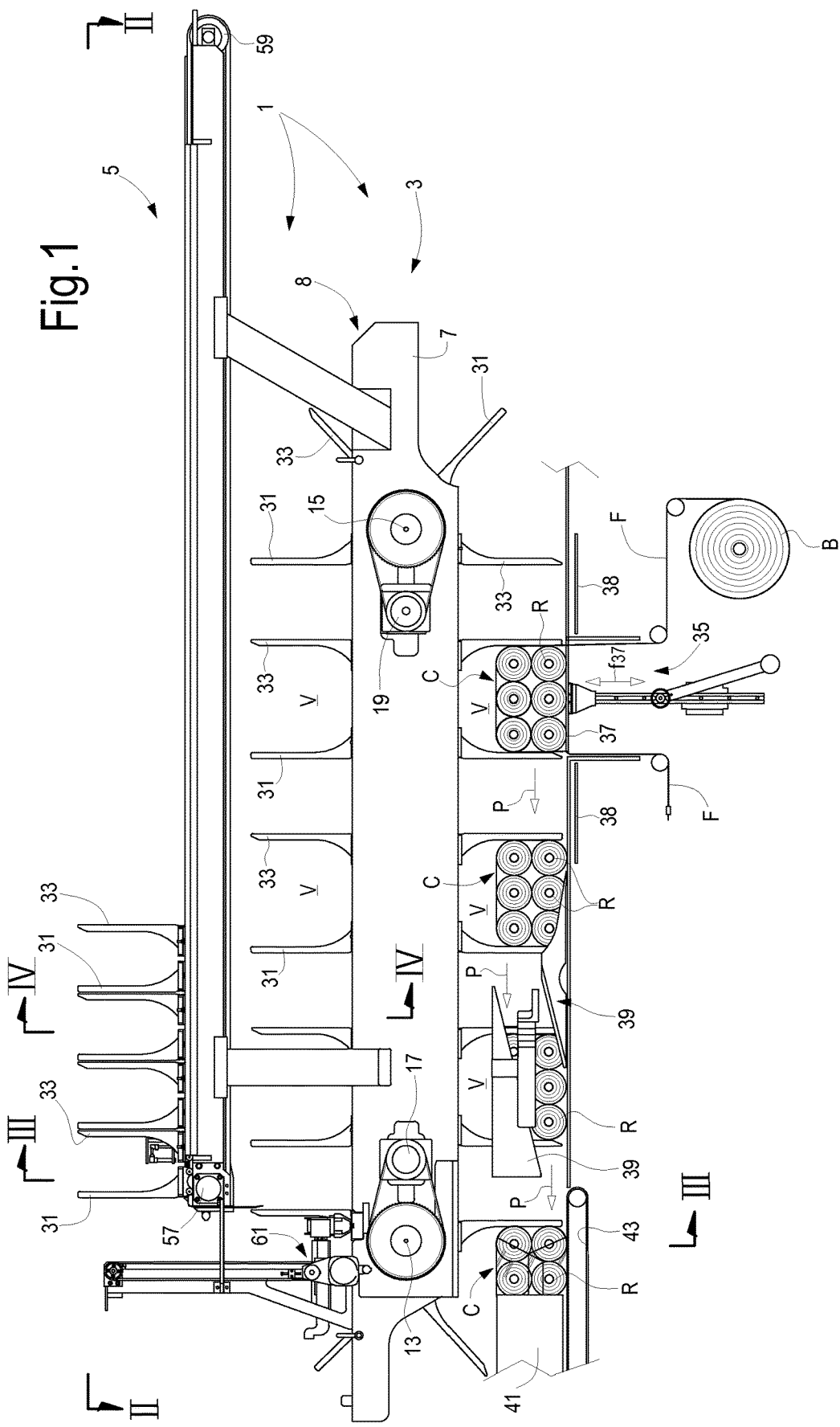

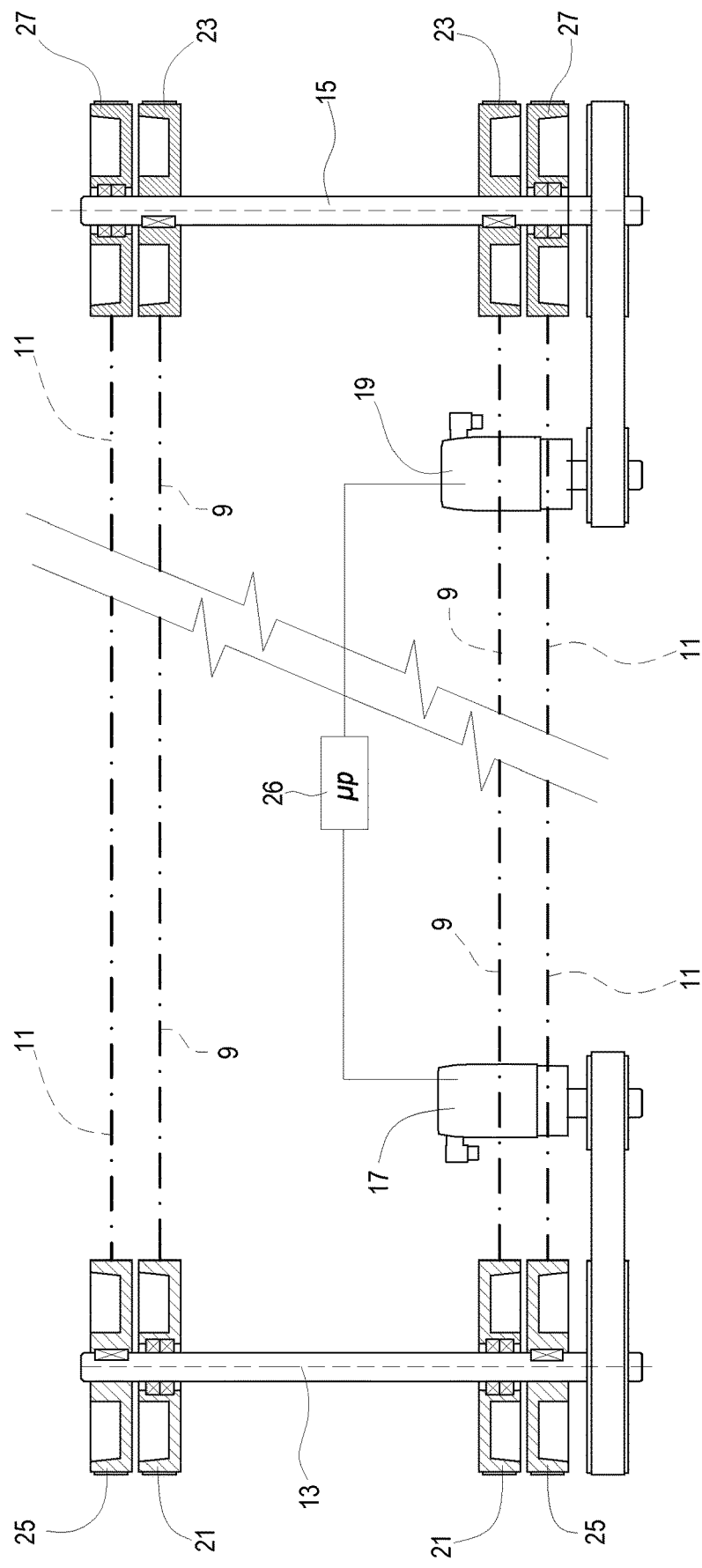

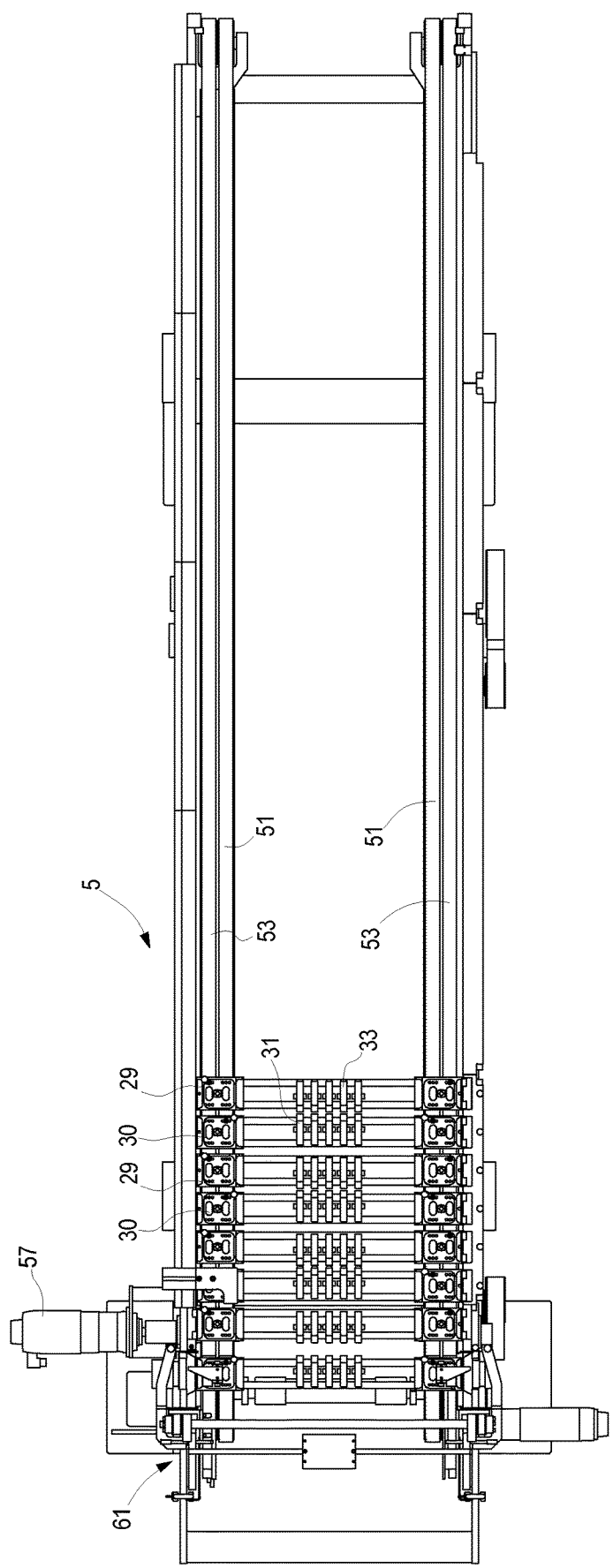

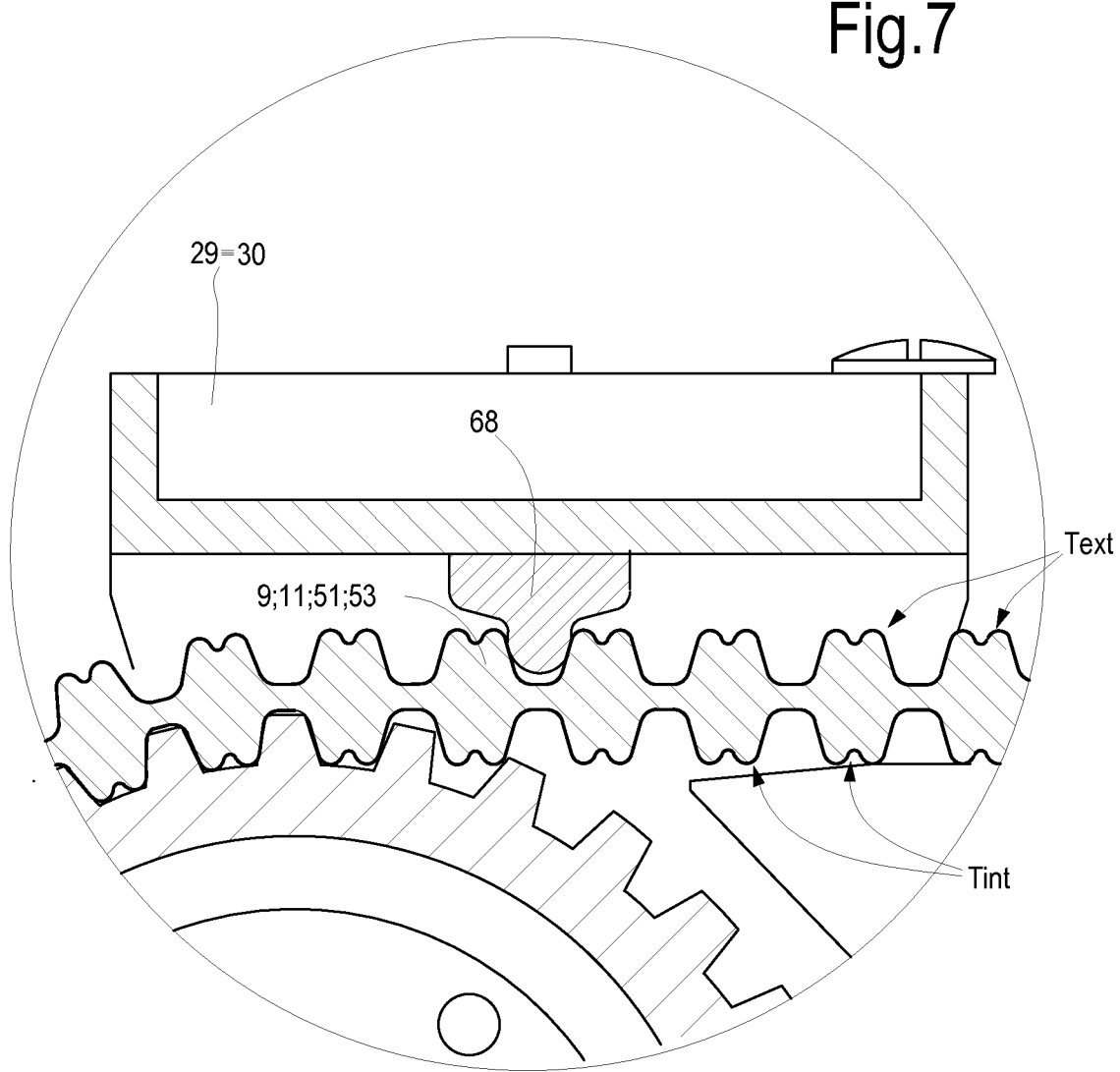

WRAPPING MACHINE

TECHNICAL FIELD

The invention relates to wrapping machines, for producing packs of products wrapped in wrapping sheets.

BACKGROUND ART

In many industrial fields wrapping machines are used for wrapping one or more products, for example a group of ordered products, in wrapping sheets, to obtain packs intended for sale. For example, machines of this type are used in production lines of rolls of tissue paper, such as toilet tissue or kitchen towel.

Wrapping machines are described, for example, in US-A-2014/0260087; EP-A-1067048; U.S. Pat. No. 6,308,497; US-A-2005/0229546; U.S. Pat. Nos. 6,799,410 and 7,789,219.

Some wrapping machines of the current art comprise a feed path of products to be wrapped in a wrapping sheet and, along the feed path, an insertion station for introducing products to be wrapped in a wrapping sheet. Downstream of the product insertion station folding members of the wrapping sheet for wrapping the wrapping sheet around the products are provided. The products are fed along the feed path by means of a conveyor device, which receives the products in the insertion station and causes their feed through the folding members. In known machines the conveyor device comprises a system of flexible members that define a closed trajectory, along which carriages constrained to the flexible members and provided with prongs or fingers move. Pairs of consecutive and adjacent carriages define compartments for accommodating products to be wrapped.

The sizes of the packs to be produced vary greatly. In fact, they depend on the size of the single products and on the number of products per pack. Each time the type of pack to be produced changes, the wrapping machine must be set up again. During set-up a number of carriages must be attached to the flexible members at a suitable mutual distance. Number of carriages and mutual distance depend on the characteristics of the pack. For this purpose, each wrapping machine is usually provided with a given number of carriages. The operator sets up the machine removing all the carriages used for a previous production cycle and replacing them with an appropriate number of carriages at a suitable mutual distance for the production of the subsequent production cycle. Optionally, a single carriage remains fastened to the conveyor device to define a zero point, relative to which the other carriages are positioned, so as to allow them to be placed correctly synchronized.

These operations are lengthy and must be carried out by skilled personnel. Therefore, they affect the production cost and the overall productivity of the plant.

Consequently, there is a need to provide a machine and a set-up method that entirely or partially solve the problems of the state of the art.

SUMMARY OF THE INVENTION

According to one aspect, a wrapping machine is provided, comprising: a feed path of products to be wrapped in a wrapping sheet; along the feed path, an insertion station of products to be wrapped in a wrapping sheet and, downstream of the insertion station, folding members of the wrapping sheet. The machine further comprises a conveyor device, which receives the products in the insertion station and causes their feed through the folding members; wherein the conveyor device comprises a system of endless flexible members and a plurality of carriages constrained to the flexible members and provided with prongs; wherein pairs of consecutive and adjacent carriages define compartments for accommodating products to be wrapped; and wherein the system of endless flexible members defines a closed trajectory, along which said carriages move. Advantageously, to simplify the set-up operations of the machine, the flexible members comprise toothed belts guided around toothed wheels. Each toothed belt comprises a first series of internal teeth, co-acting with the toothed wheels, around which the toothed belt is guided. Each belt further comprises a second series of external teeth, co-acting with connection elements of the carriages. In practice, each belt is a double sided belt, with internal teeth and external teeth. The internal teeth are those oriented toward the inside of the closed trajectory defined by the belt, while the external teeth are those oriented toward the outside of the closed trajectory defined by the belt.

Each carriage comprises toothed profiles complementary to the external teeth of the toothed belts, suitable to provide a shape coupling with the external teeth of the respective toothed belts.

In this way a system that is extremely economical, rapid and reliable is obtained for constraining and releasing the carriages with respect to the flexible members of the conveyor device. The coupling and release operations of the carriages are very simple and can also be carried out by personnel who are not specifically trained, in very short times. Moreover, as will be described in detail hereunder with reference to the accompanying drawings, with this constraining and releasing system it is possible to produce an automatic or semi-automatic system for machine set-up, optionally also equipping the machine with a magazine of carriages and of manipulators to attach carriages to the conveyor device or to detach and remove carriages from the conveyor device and insert them in the magazine. Although this system is particularly advantageous and useful in order to make the machine more efficient and in order to reduce the times required for set up, the use of double sided belts as flexible members of the conveyor device can offer important advantages also in machines that are not provided with a magazine and with manipulators for automatic or semi-automatic movement of the carriages. Therefore, the description below relating to the use of a magazine of carriages and of manipulators for moving the carriages must not be considered binding, but forms a further particularly advantageous and non-limiting development of the machine described herein. Mounting carriages on endless flexible members formed by double sided toothed belts is also facilitated in the case of machines that are not provided with automatic or semi-automatic means for movement of the carriages.

Moreover, the use of double sided toothed belts as flexible members of the conveyor device avoids the need to use special flexible members, made specifically for mounting and removing the carriages. The flexible members are in this way much more economical and much easier, faster and less expensive to replace, for example in the case of wear or breakage, with respect to current art machines, where the flexible members are designed for the specific application. In fact, in the machine described herein, double sided toothed belts of the type commonly available on the market as mechanical components for multiple purposes can be used as flexible members of the conveyor device.

In practical embodiments, the prongs of the carriages extend toward the outside of the closed path defined by the flexible members.

In some embodiments, the feed path of the products to be wrapped is located below the flexible members. In this case, the endless flexible members have a lower active branch and an upper return branch. The insertion station of the products to be wrapped can comprise an elevator that lifts groups of ordered products from a lower height, for example from a level at which a feed line is located, to a greater height at which the feed path is located, and where the prongs of the carriages constrained to the flexible members of the conveyor device move.

The insertion station of the products can be provided with members that prepare a wrapping sheet, for example a plastic film, so that by lifting the products to be wrapped to the height of the feed path, the products are at least partially wrapped laterally with the wrapping sheet. Static or dynamic folding members can be arranged along the feed path. A welding or closing station of the pack can be located downstream of the feed path.

In some embodiments, a guide system of the carriages extends along the closed trajectory defined by the endless flexible members to which the carriages are constrained. The carriages are provided with engagement elements to the guide system, for example rollers or wheels.

In practical embodiments, the guide system extends parallel to the path defined by the endless flexible members, at least along the active branch of the path. The guide system is configured so as to maintain the carriages engaged with the toothed belts.

In practical embodiments, the guide system can comprise two opposite channels, positioned on two sides of the system of flexible members. Each carriage comprises engagement elements to the two opposite channels, for example one or two wheels or rollers on each side of the carriage, which engage in the two channels.

To simplify the operations for mounting and removing the carriages with respect to the toothed belts, each channel of the guide system can comprise an opening for the extraction and insertion of the carriages.

For greater operating efficiency, in some embodiments the toothed belts are provided with contrasting or supporting members, on which the toothed belts run, and which prevent the belts from flexing toward the inside of the closed trajectory. In this way, the operating safety and reliability of the system for constraining the carriages to the toothed belts is increased.

In some embodiments, for example, along at least a portion of the closed trajectory defined by the system of flexible members there are arranged contrasting surfaces, positioned inside the closed trajectory, on which the toothed belts rest and slide.

In practice, the system of flexible members of the conveyor device can comprise a single pair of toothed belts. In preferred embodiments, the conveyor device comprises a first pair of flexible members and a second pair of flexible members, which extend along the closed trajectory. Each flexible member comprises a respective double sided toothed belt. A first series of carriages are constrained to the first pair of flexible members and a second series of carriages are constrained to the second pair of flexible members. The carriages of the first series and the carriages of the second series are arranged alternated with each other along the closed trajectory, so that each compartment for accommodating the products to be wrapped is defined by a carriage of the first series and by a carriage of the second series.

In some embodiments, the first pair of flexible members and the second pair of flexible members are adjustable to modify the mutual distance between pairs of carriages that form each compartment, to modify the size of the compartment in the direction of feed of the products along the feed path. For this purpose, in embodiments described herein two motors are provided, one for each pair of flexible members. By modifying the phase between the two motors, the mutual distances between the two carriages of each pair of carriages defining each single compartment of the conveyor device can be modified.

Further advantageous embodiments and features of the method and of the machine described herein are described hereunder with reference to the accompanying figures and in the appended claims, which form an integral part of the present description.

BRIEF DESCRIPTION OF THE DRAWINGS

The invention will be better understood by following the description and accompanying drawings, which show a non-limiting exemplary embodiment of the invention. More in particular, in the drawing:

FIG. 1 shows a schematic side view of a machine according to the invention;

FIG. 1A shows a kinematic diagram of the transmission of the conveyor device of the machine of FIG. 1;

FIG. 2 shows a plan view according to II-II of FIG. 1;

FIG. 7 shows an enlargement of the coupling members between a carriage and a toothed belt;

DETAILED DESCRIPTION OF EMBODIMENTS

Figure 3:
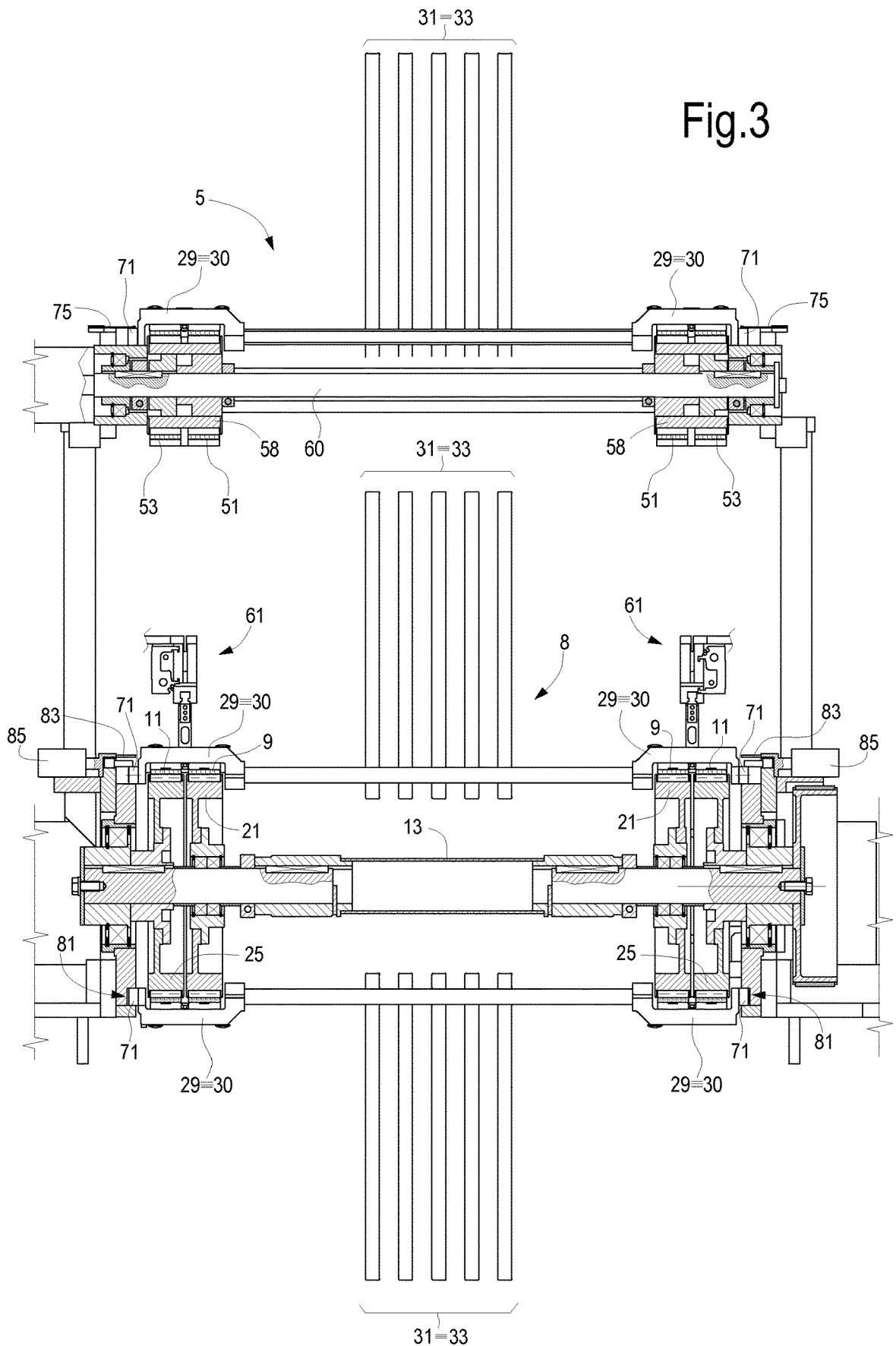
FIG. 3 shows a section according to III-III of FIG. 1.

The following detailed description of embodiments given by way of example refers to the accompanying drawings. The same reference numbers in different drawings identify identical or similar elements. Moreover, the drawings are not necessarily to scale. The following detailed description does not limit the invention. Rather, the scope of the invention is defined by the accompanying claims.

Reference in the description to "an embodiment" or "the embodiment" or "some embodiments" means that a particular feature, structure or element described in relation to an embodiment is included in at least one embodiment of the object described. Therefore, the phrase "in an embodiment" or "in the embodiment" or "in some embodiments" used in the description does not necessarily refer to the same embodiment or embodiments. Furthermore, the particular features, structures or elements may be combined in any appropriate manner in one or more embodiments.

In FIG. 1, the reference numeral 1 indicates as a whole a wrapping machine according to the present description. The wrapping machine 1 comprises a wrapping section 3 and a magazine 5. In the embodiment illustrated the magazine 5, which stores components that can be used in variable number in the wrapping section 3, is in a position higher than the wrapping section 3 and at least partially superimposed thereon. This allows the overall footprint of the wrapping machine to be reduced and the various members of which it is composed to be simplified. However, it would also be possible to arrange the magazine 5 in a different position with respect to the wrapping section, for example at the side of it and at the same height.

The wrapping section comprises a load-bearing structure 7 extending horizontally and carrying a conveyor device 8. In some embodiments, the conveyor device 8 can comprise a pair of flexible members. In the embodiment illustrated, the conveyor device 8 comprises two pairs of flexible members, indicated with 9 and 11, respectively. Each flexible member 9, 11 can, for example, comprise a chain. Preferably, in the embodiment illustrated each flexible member 9, 11 comprises a belt. Preferably, each belt 9, 11 is toothed. Even more preferably, as will be described in greater detail below and for the purposes that will be apparent from the following description, each belt 9, 11 is a double sided belt, i.e. having teeth on both sides.

Belts 9, 11 are guided around toothed wheels supported by shafts 13 and 15, motorized by motors 17 and 19, respectively. FIG. 1A schematically illustrates the arrangement of the belts 9, 11, of the shafts 13, 15 and of the motors 17, 19, as well as of the toothed guide wheels of the belts for greater clarity. However, this arrangement is known in the art. In the diagram of FIG. 1A, two toothed wheels 21 are fitted on the shaft 13 and are rotated by the motor 17. The innermost belts 9 are guided thereon. On the opposite side, the belts 9 are guided around toothed wheels 23, mounted idle on the shaft 15. The belts 11 are instead guided around toothed wheels 25 supported idle on the shaft 13 and around toothed drive wheels 27, fitted on the shaft 15.

With this arrangement the two motors 17, 19 can move the belts 9, 11 simultaneously. Moreover, by modifying the phase between the two motors 17, 19 the phase between the pair of belts 9 and the pair of belts 11 can also be modified. The reference numeral 26 schematically indicates in FIG. 1A an electronic control unit by means of which the phase of the two motors and/or other parameters of the wrapping machine 1 can be modified.

Carriages 29, 30, each of which is provided with one or more fingers or prongs 31, 33, are fastened on the belts 9, 11. The prongs 31, 33 are mounted on the carriages 29, 30 so as to be oriented toward the outside of the closed path defined by the belts 9, 11, and in particular approximately orthogonally to the trajectory of the belts 9, 11. Each pair of consecutive carriages 29, 30 with the respective prongs 31, 33 defines a compartment V for accommodating products to be wrapped. The carriages 29 are all fastened to the belts 9 and not connected to the belts 11, while all the carriages 30 are fastened to the belts 11 and not connected to the belts 9. In this way, the distance between carriages 29, 30 of each pair can be modified acting on the phase between the motors 17, 19.

The conveyor device 8 moves along a lower active path and an upper return path. An insertion station 35 of the products to be wrapped is arranged along the active path of the conveyor device 8. In the example illustrated, the products to be wrapped are rolls R of tissue paper, for example rolls of toilet paper or kitchen towel. In the set up illustrated in FIG. 1 each pack C comprises two layers of three rolls R each, but it must be understood that this is only one of the possible configurations of the packs that can be produced by the wrapping machine 1.

The insertion station 35 can comprise an elevator 37 provided with a reciprocating lifting and lowering movement according to double arrow f37, to pick up groups of rolls R from a feed line below (not shown) and transfer them to the level of a feed path P defined by the lower branch of the conveyor device 8.

In a manner known per se, a wrapping sheet F delivered by a reel B is arranged along the lifting trajectory of the elevator 37. The wrapping sheet F can, for example, be a plastic film. The lifting movement of the groups of rolls R causes the wrapping sheet F to wrap three sides of the pack C.

Folding members, arranged along the feed path P and indicated schematically with 38 and 39, wrap the wrapping sheet F around the lower face of each group of rolls R and on the two lateral faces. In the embodiment illustrated, the folding members 39 are stationary, but it would also be possible to use dynamic folding members, i.e., provided with a wrapping movement of their own, as known from current art machines. Examples of folding members are described in the prior art documents cited in the introductory part of the present description.

Movement of the packs C of rolls R being produced along the path P is obtained by the conveyor device 8 and is controlled by the motors 17, 19. Each pack C is held in a respective compartment V defined between two series of prongs 31, 33 of two corresponding carriages 29, 30.

The packs C are released by the conveyor device 8 at the exit of the feed path P, where a welding station, 41, known per se, is located. A conveyor, indicated generically with 43, picks up the packs C exiting from the wrapping machine 1 and feeds them through the welding station 41.

The size of the compartments V must be adjusted as a function of the shape and size of the packs C to produce. Small variations of size in the direction of the feed path P can be obtained by modifying the phase between the motors 17, 19 as described above. However, when the arrangement and the number of rolls R per pack C varies, it is necessary to modify the number of carriages 29, 30 and their position along the toothed belts 9, 11.

The magazine 5 of carriages 29, 30 is provided to facilitate these operations. The magazine 5 comprises (see FIGS. 1 and 2) a number of flexible members corresponding to the number of flexible members of the conveyor device 8. In the embodiment illustrated, the magazine 5 comprises four toothed belts 51, 53, arranged in the same mutual position as the toothed belts 9, 11 of the conveyor device 8. However, contrary to the toothed belts 9, 11 of the conveyor device 8, the toothed belts 51, 53 of the magazine 5 do not require to be phased with one another in a variable manner and can therefore be moved by a single motor 57 that controls the rotation of four coaxial toothed wheels 58 fitted on a common shaft 60. On the opposite side of the magazine 5 the toothed belts 51, 53 are guided around idle toothed wheels 59.

The carriages 29, 30 are provided with constraining members to the toothed belts 9, 11 and to the toothed belts 51, 53. Preferably, in the embodiment illustrated the same constraining members are used for connection both to the toothed belts 9, 11, and to the toothed belts 51, 53. However, in less advantageous embodiments, the carriages 29, 30 could also be provided with constraining members to the belts 9, 11 and with different constraining members to the toothed belts 51, 53. In this case, a single pair of toothed belts could also be provided on the magazine 5, instead of two pairs of toothed belts 51, 53.

In further embodiments, the magazine 5 may not have flexible members for moving the carriages 29, 30, but the movement of the carriages 29, 30 in the magazine 5 can take place with other movement members, for example with motorized slides that selectively engage each carriage and move it along tracks or rails, to which the carriages can be constrained.

The reference numeral 61 indicates manipulators that pick up carriages 29, 30 from the magazine 5 and transfer them to the conveyor device 8 and vice versa. The function and structure of the manipulators are shown in particular in the sequence of FIGS. 8A-8D, which will be described in greater detail below.

In some embodiments, the manipulators 61 comprise, for each side of the wrapping machine 1, a gripper 63 provided with a double movement according to the arrows fx and fy, i.e., along two orthogonal axes, respectively horizontal (parallel to the direction of the movement of the belts 9, 11) and vertical, to transfer the carriages from the height at which the conveyor device 8 is located to the height at which the magazine 5 above is located.

The vertical movement can be obtained by means of an endless belt or chain 69 that moves a slide 65 carrying the gripper 63 along a guide 67. The slide 65 can be telescopic, to move the respective gripper 63 in the direction fx.

To greatly simplify mutual coupling between carriages 29, 30 and the flexible members of the conveyor device 8 and of the magazine 5, the double sided belts described above are used as flexible members, and each carriage 29, 30 is provided with toothed profiles complementary to the external teeth of the toothed belts 9, 11, 51, 53.

FIG. 7 shows an enlargement of an example of a portion of any one of the toothed belts 9, 11, 51, 53 with which the wrapping machine 1 is provided. The belt comprises external teeth Text formed by a series of external teeth, and internal teeth Tint, formed by a series of internal teeth. The teeth Tint and Text are formed on the two main faces of the toothed belt. The teeth Tint are named internal as they face the inside of the closed path defined by the toothed belt, while the teeth Text are named external teeth, as they are provided on the face of the toothed belt facing the outside of the closed path defined by the toothed belt. In practice, the internal teeth Tint are those that mesh with the teeth of the toothed wheels, around which the respective belt is guided.

The external teeth Text instead co-act with toothed profiles 68 with which the carriages 29, 30 are provided. The toothed profiles 68 of the carriages 29 are positioned so as to couple with the toothed belts 11 and 53, while the toothed profiles 68 of the carriages 30 are positioned so as to couple with the toothed belts 9, 51, or vice versa. In this way, all the carriages 29 couple with the toothed belts 11 and all the carriages 30 couple with the toothed belts 9, or vice versa. The toothed profiles 68 constitute or form part of connection elements between the carriages 29, 30 and the belts 9, 11, 51, 53.

The described solution allows at least two important advantages. Firstly, the flexible members 9, 11, 51, 53 can be produced with material available on the market, as the toothed belts that can be used are generic double sided toothed belts manufactured as standard articles for multiple purposes. This makes production of the machine more economical and above all simplifies its maintenance. A broken belt can be replaced with another rapidly and at low cost.

Moreover, the mutual coupling and decoupling between carriages 29, 30 and belts 9, 11; 51, 53 is easy and rapid, and only requires movement of the two grippers 63.

Figure 4:
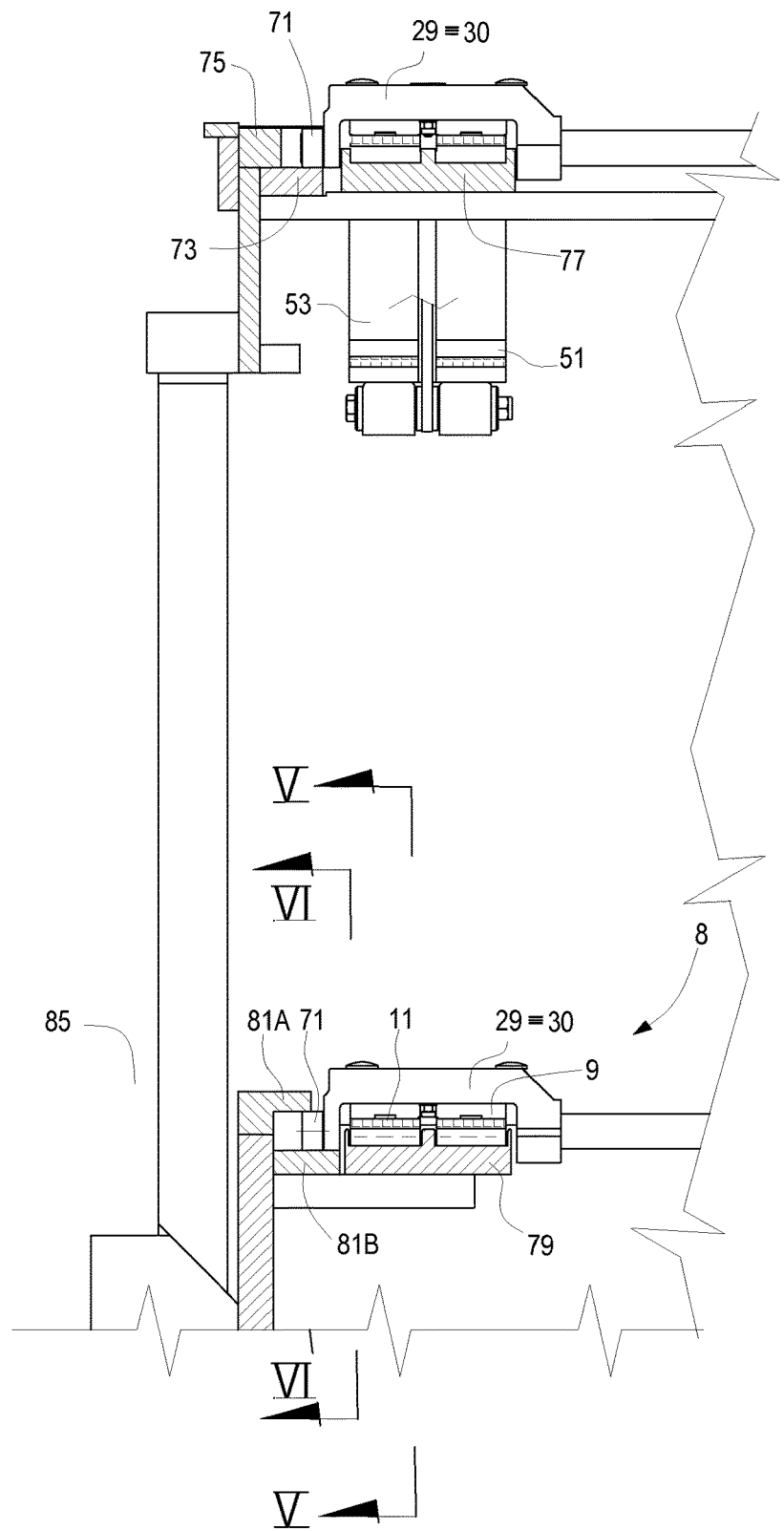
FIG. 4 shows a section according to IV-IV of FIG. 1.
Figure 6:
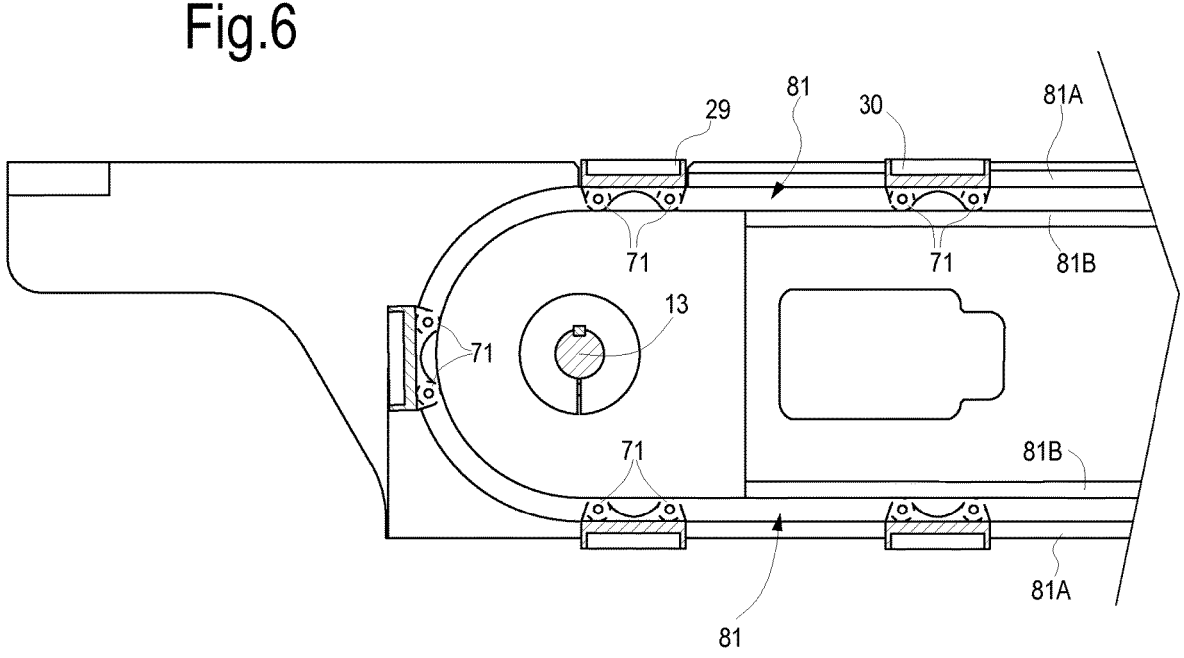

To obtain reliable coupling between carriages 29, 30 and teeth of the toothed belts 9, 11, 51, 53, in some embodiments the carriages 29, 30 can be provided, on both ends, with one or two engagement elements, e.g., wheels or rollers 71, see in particular FIGS. 4 and 6. The magazine 5 can comprise, on each side, a track 73, extending along the extension of the belts 51, 53. The wheels 71 of the carriages 29, 30 that are located in the magazine 5 can roll on the tracks 73. To prevent the wheels or rollers 71 from lifting off the tracks 73, opposing profiles 75 can be provided along said tracks 73, which together with the tracks 73 form a sort of C-shaped channel inside which the wheels or rollers 71 are inserted. The channels are open at the top in the area of insertion and removal of the carriages by the manipulators 61.

In some embodiments, to prevent a downward flexing of the upper branches of the belts 51, 53 from causing accidental detachment of the toothed profiles 68 from the external teeth of the belts 51, 53, along the upper branches thereof these latter can rest inferiorly on a support 77.

Figure 5:
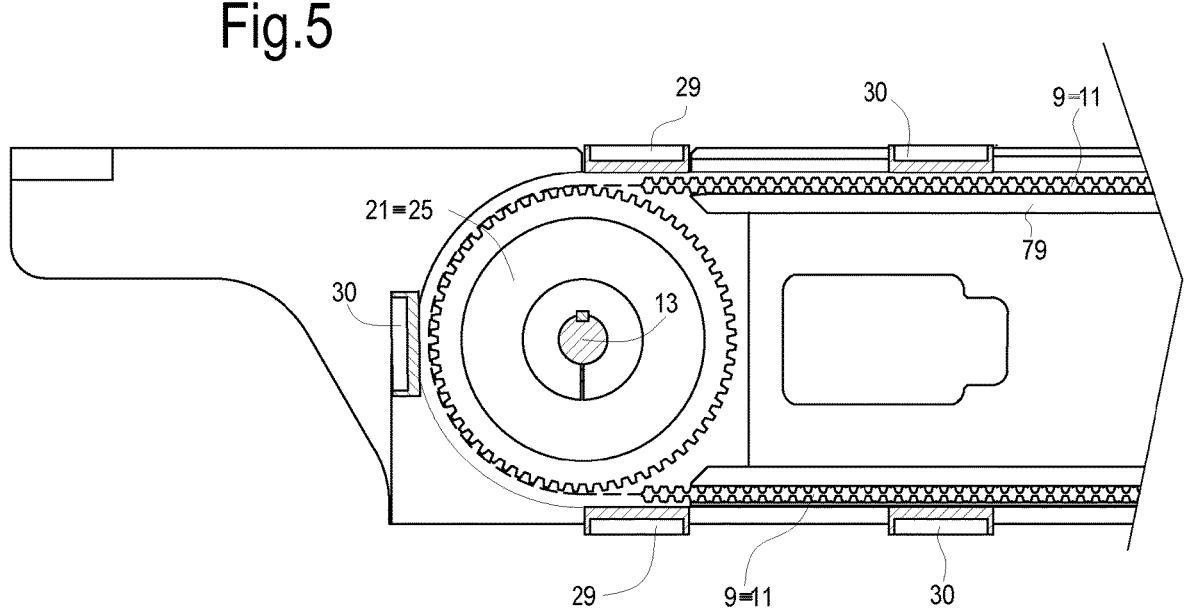
FIGS. 5 and 6 show sections according to V-V and VI-VI of FIG. 4.

A similar arrangement can be provided on the two sides of the conveyor device 8, along the closed paths defined by the belts 9, 11. For example, the inner surface (i.e. the one facing the inside of the closed path) of each belt 9, 11 can rest on a rest or support 79 (FIG. 5) defining a contrasting surface, that prevents the belt from flexing toward the inside of the closed path. Moreover, two C-shaped guides indicated with 81 (see in particular FIGS. 4 and 6) can be provided on the two sides of the path of the belts 9, 11. Each C-shaped guide can be formed of two parallel rectilinear elements 81A; 81B. To allow insertion and removal of carriages 29, 30, the C-shaped guides 81 can be interrupted in the area in which the manipulators 61 are located. Here the C-shaped guides 81 can be opened and closed by means of respective doors 83, activated by actuators 85, for example piston-cylinder actuators, see in particular FIG. 3)

Figure 8A:
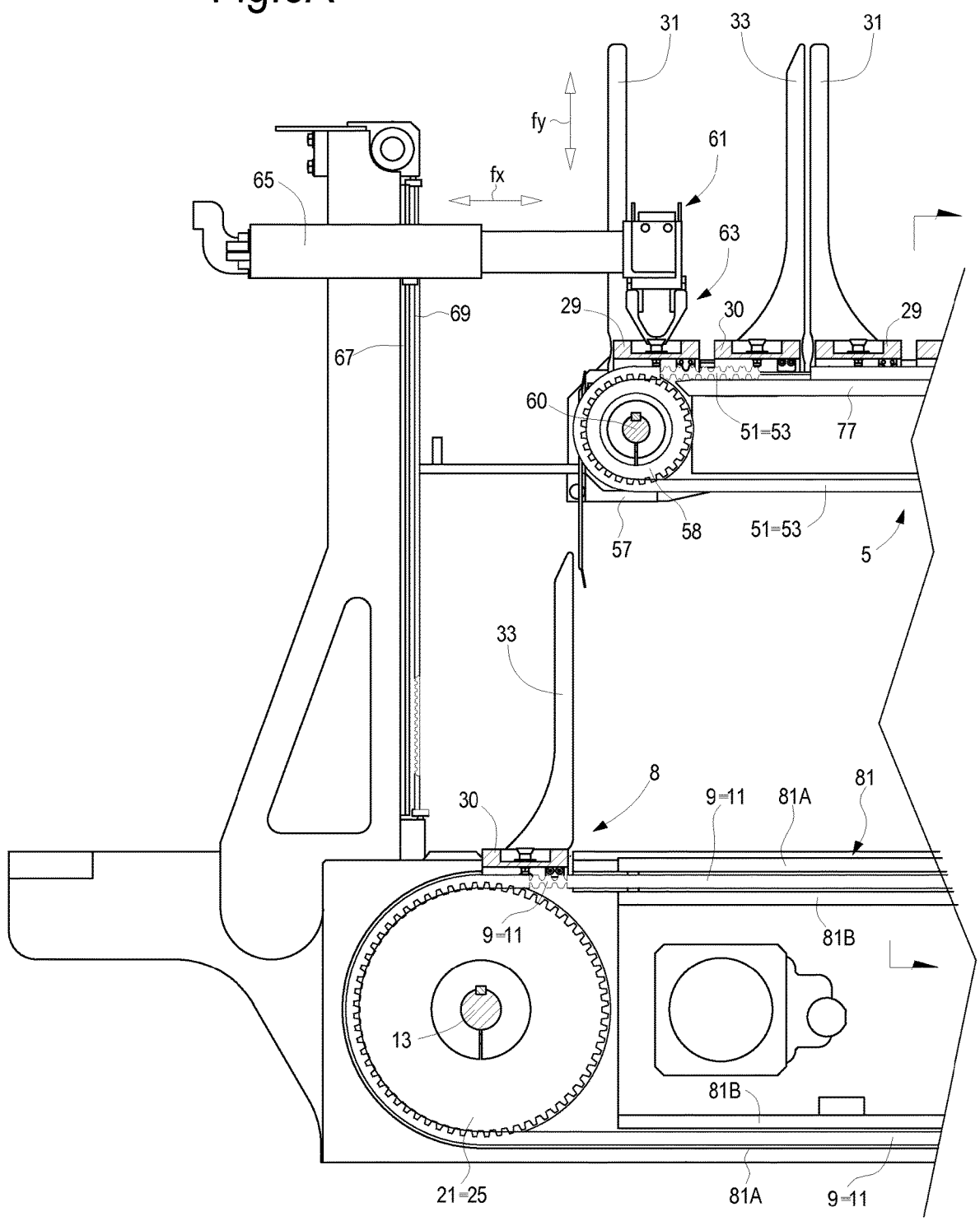
FIGS. 8A, 8B, 8C, 8D show a sequence of removing carriages from the magazine and attaching them to the conveyor device.
Figure 8B:
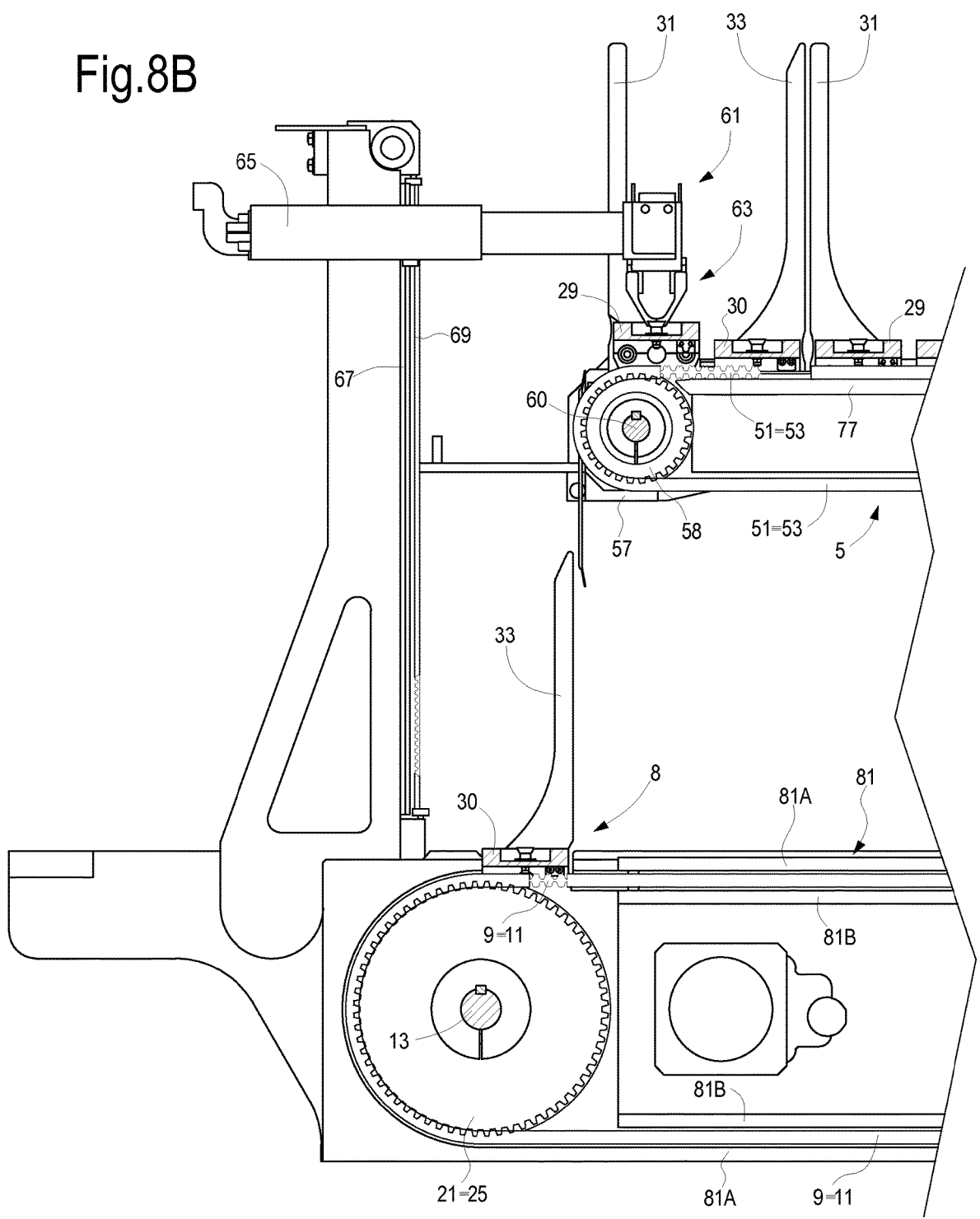
Figure 8C:
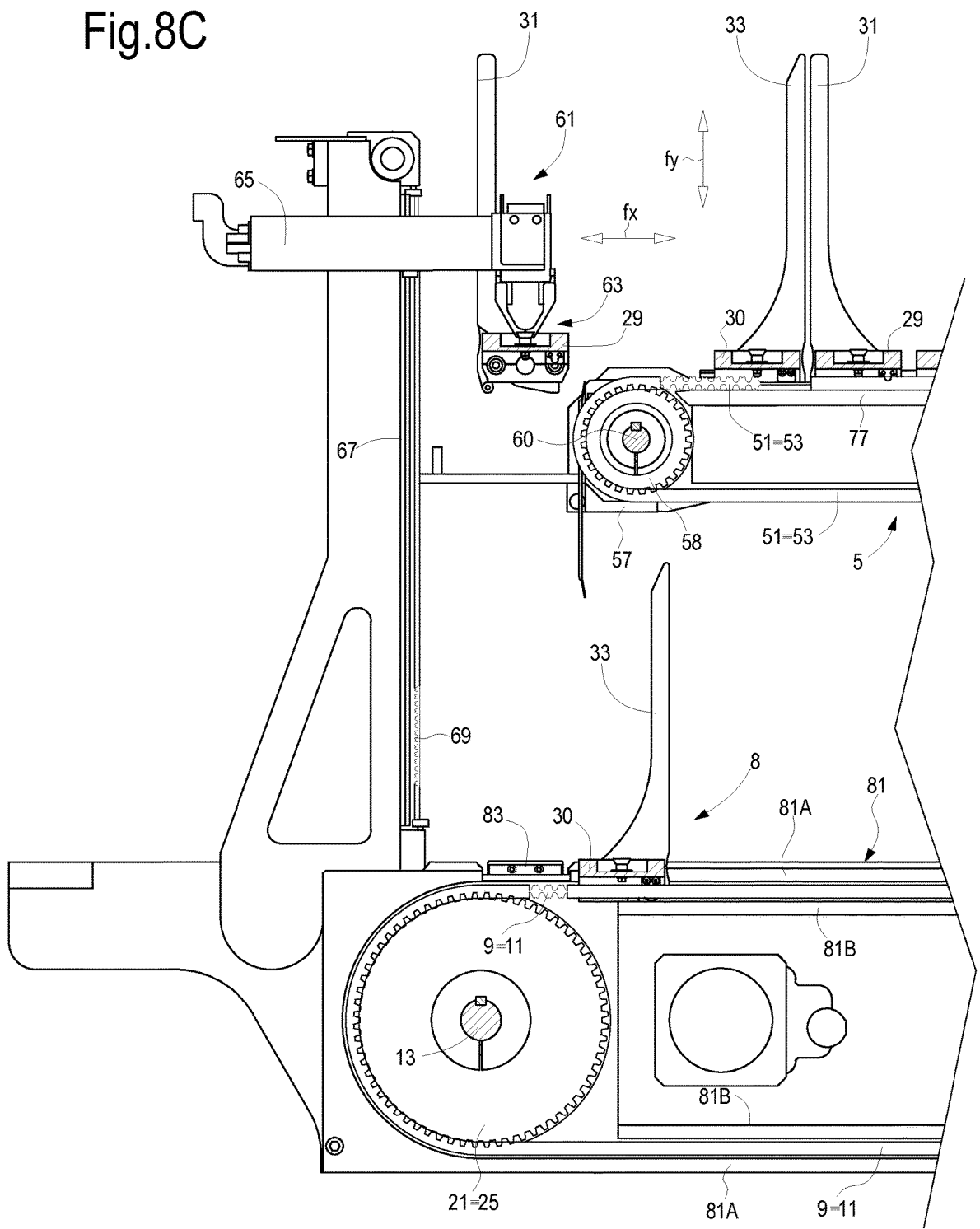
Figure 8D:
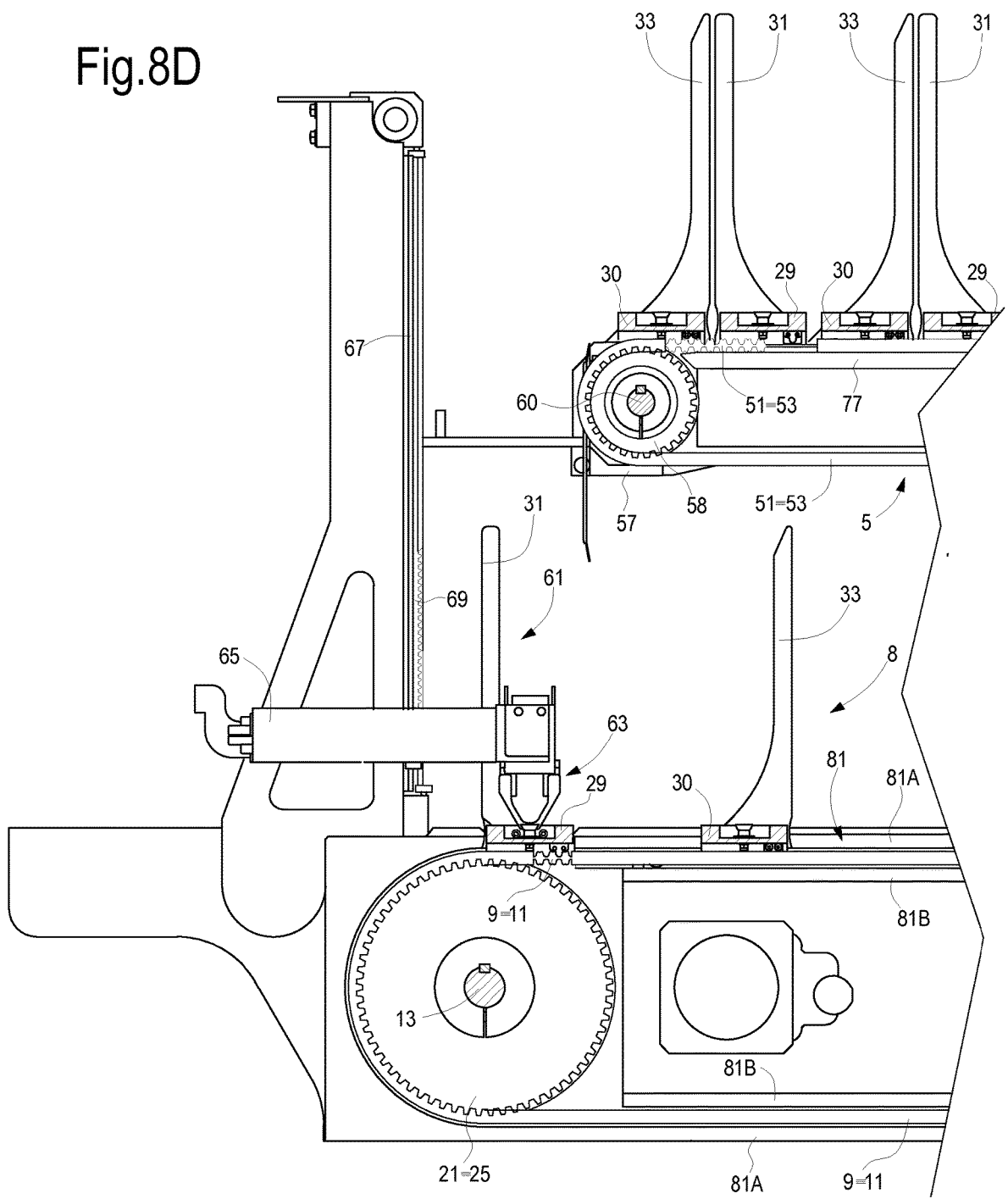

FIGS. 8A-8D show an operating sequence for insertion of carriages 29, 30 from the magazine 5 to the conveyor device 8. In FIG. 8A the grippers 63 of the manipulators 61 are arranged above the ends of a carriage (in the example a carriage 29) located at the end of the magazine 5. The carriages 29, 30 can be provided with pins or other members that can be engaged by the grippers 63. In FIG. 8A each gripper 63 has already engaged the respective pin of the carriage 29.

Subsequently (FIG. 8B) the grippers 63 of the manipulator 61 are lifted (arrow fy) and then translate horizontally (FIG. 8C, arrow fx) to move the carriage 29 out of the footprint of the magazine 5. In the subsequent step (FIG. 8D) the grippers 63 are lowered and arrange the carriage 29 on the belts 9, 11 of the conveyor device 8. The toothed profiles 68 of the carriage 29 engage with the toothed belts of the conveyor device. Coupling of the carriage 29 to the conveyor device 8 is made possible by the fact that the door 83 is temporarily opened.

The operations described above are repeated for all the carriages 29, 30 that must be transferred from the magazine 5 and mounted on the conveyor device 8. At each transfer operation of a carriage 29, 30 from the magazine 5 to the conveyor device 8, the belts 51, 53 advance to position the subsequent carriage in the operating area of the manipulator 61. Likewise, the conveyor device 8, and more precisely the belts 9, 11, advance by a pitch corresponding to the distance required between each carriage 29, 30 and the next. As observed previously, while the carriages 29 are constrained to the belts 9, the carriages 30 are constrained to the belts 11, or vice versa. By acting in a controlled manner on the two motors 17, 19 it is possible to set the required distance between carriages 29, 30 of each pair and consequently the size of each compartment V in the direction of the feed path P. Moreover, again by acting on the motors 17, 19, it is possible to set the required pitch between consecutive compartments V.

All the operations described above can be carried out automatically through the control of the electronic control unit 26. An operating panel can be provided, in which the operator can select the required format of the pack C so that the electronic control unit automatically calculates the number and the positions of the carriages on the belts 9, 11. Alternatively, a line supervision unit can be provided, which sets on all the machines, including the wrapping machine, the type of product to be produced through predetermined recipes.

When a work cycle ends and the wrapping machine 1 requires be set up for a different format, the operations described above can be carried out in reverse order, to remove the carriages 29, 30 from the conveyor device 8 and insert them in the magazine 5.

As a rule, at each change of format of the packs C, all the carriages 29, 30 can be removed from the conveyor device 8 and arranged in the magazine 5 and subsequently all the carriages 29, 30 required to produce the subsequent series of packs can be mounted, picking them up from the magazine 5 and mounting them on the conveyor device 8. Nonetheless, this may not always be necessary. For example, it may be sufficient to modify the mutual position of the carriages 29 and of the carriages 30 on the conveyor device 8, without increasing or decreasing their number. In this case, it may be sufficient to act on the motors 17, 19 and on the manipulators 61.

In other situations, it may be sufficient to transfer only a part of the carriages 29, 30 from the conveyor device 8 to the magazine 5, or vice versa. In this case, the sequence of FIGS. 8A-D or the opposite sequence is carried out for only a part of the carriages 29, 30.

Moreover, the provision of manipulators 61 allows the operations described above to be carried out in a completely automatic manner. However, it would also be possible to carry out the aforesaid operations with a manual control. For example, an operator can manually control feed of the motors and the manipulators by means of a suitable interface provided for the electronic control unit 26, for example a keypad, a mouse or the like.

The invention claimed is:

1. A wrapping machine comprising:
    a feed path of products to be wrapped in a wrapping sheet;
    along the feed path, an insertion station of products to be wrapped in the wrapping sheet and folding members of the wrapping sheet;
    a conveyor device, which receives the products in the insertion station and causes feed of the products through the folding members; wherein the conveyor device comprises a system of endless flexible members and a plurality of carriages constrained to the flexible members and provided with prongs; wherein pairs of consecutive and adjacent carriages define with their respective prongs compartments for accommodating products to be wrapped; and wherein the system of endless flexible members defines a closed trajectory along which said carriages move; wherein each flexible member of said system of endless flexible members has a lower active branch extending along the feed path, and an upper return branch; wherein the carriages move along the lower active branch of the flexible members to transfer the products to be wrapped from the insertion station through the folding members towards a product outlet, and the upper return branch moves the carriages from the product outlet back towards the insertion station;
    wherein the flexible members comprise toothed belts guided around toothed wheels, and wherein each toothed belt comprises a first series of internal teeth, co-acting with the toothed wheels, and a second series of external teeth, co-acting with connection elements of the carriages to connect said carriages to said flexible member; and wherein the connection elements comprise toothed profiles complementary to the external teeth of the toothed belts to provide a shape coupling with the external teeth of respective toothed belts;
        a guide system for the carriages which extends along the closed trajectory defined by the flexible members; wherein the carriages include engagement elements to the guide system;
    wherein the guide system comprises two opposite guides with one positioned on each side of the system of flexible members;
    wherein each carriage comprises said engagement elements engaged with the two opposite guides;
    wherein each guide of the guide system comprises an opening for extraction and insertion of carriages;
    and wherein said opening is located along the upper return branch of the flexible members and is accessible vertically from above to introduce carriages in the guides from above the upper return branch and remove carriages from the guides from above the upper return branch.

2. The wrapping machine of claim 1, wherein the engagement elements comprise, for each carriage, at least one roller for each guide of the guide system.

3. The wrapping machine of claim 1, wherein said toothed belts are provided with opposing members that prevent the toothed belts from bending toward an inside of the closed trajectory.

4. The wrapping machine of claim 1, wherein the system of flexible members of the conveyor device comprises a first pair of toothed belts and a second pair of toothed belts, which extend along the closed trajectory; wherein a first series of carriages is constrained to the first pair of toothed belts and a second series of carriages is constrained to the second pair of toothed belts; and wherein the carriages of the first series and the carriages of the second series are arranged alternated with each other along the closed trajectory, so that each compartment for accommodating the products to be wrapped is defined by a carriage of the first series and by a carriage of the second series.

5. The wrapping machine of claim 4, wherein the first pair of toothed belts and the second pair of toothed belts are adjustable to modify mutual distance between pairs of carriages that form each compartment, and to modify size of the compartment in a direction of the feed path.

* * * * *